June 26, 1962     H. KOHLER     3,041,096
KNOTTER
Filed Aug. 18, 1960     2 Sheets-Sheet 1
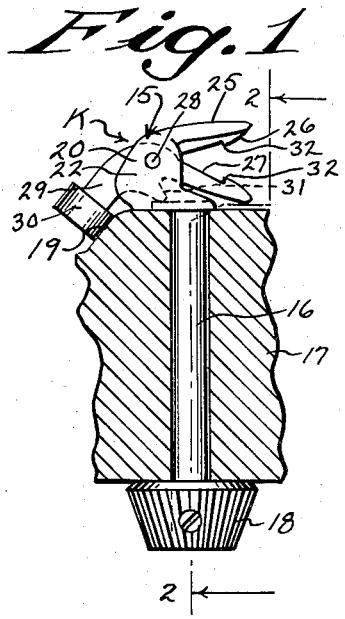
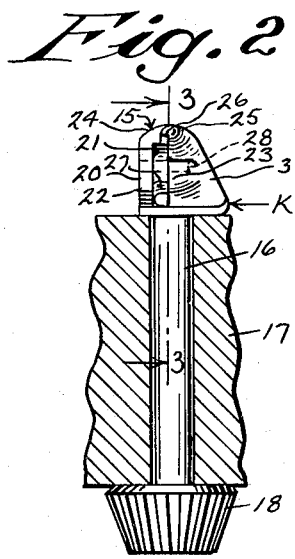
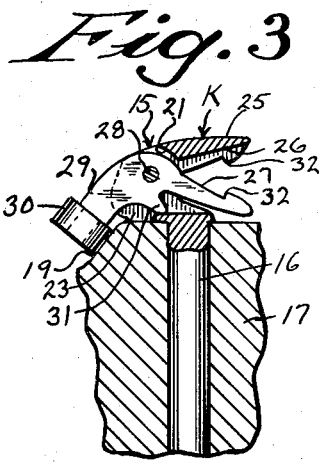
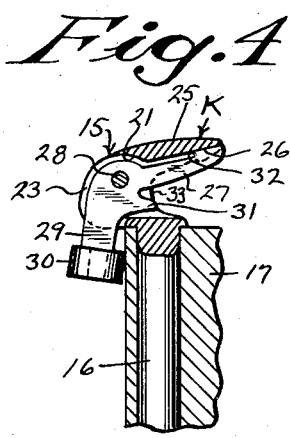
INVENTOR
HERMAN KOHLER
BY *Wright & Wright*
ATTORNEYS June 26, 1962  H. KOHLER  3,041,096
KNOTTER Filed Aug. 18, 1960  2 Sheets-Sheet 2

INVENTOR
HERMAN KOHLER

BY *Wright and Wright*

ATTORNEYS

United States Patent Office 3,041,096
Patented June 26, 1962

3,041,096
KNOTTER
Herman Kohler, Milwaukee, Wis., assignor to Felins Tying Machine Co., Milwaukee, Wis.
Filed Aug. 18, 1960, Ser. No. 50,444
1 Claim. (Cl. 289—11)

This invention appertains to tying machines of the type utilized for securing bundles, packages and the like, and is of the same character as shown in Patents No. 1,407,481 and 2,346,726, issued respectively on February 21, 1922, and April 18, 1944.

The present invention relates specifically to an improvement in the knotter mechanism of the abovementioned patents, whereby the kotter mechanism will operate more efficiently and will have a greater length of life.

Much difficulty has been experienced in the efficient handling by the knotter of different sizes or plies of twine or cord and while a certain size of twine may be recommended for a certain type of machine, the user of the machine invariably accepts and uses all types of twine. Likewise, it is desirable to have a knotter which will effectively handle all characters of twine or flat tape or ribbon so that the machine will be of a universal character and be capable of tying bundles and packages with different strengths of twine according to the type of the bundles or packages being tied.

It is, therefore, one of the primary objects of my invention to provide a knotter having an improved type of jaw and mounting, whereby all sizes of twine, and even flat tape or ribbon can be effectively gripped and handled without distortion or spreading of the jaws of the knotter.

In the knotter shown in the original patents, the twine or cord was held only between the adjacent knotter faces of the jaws and thick twine tended to spread the jaws and eventually allow the slipping of the twine.

It is therefore, another salient object of my invention to provide a longitudinally extending gripping ledge or rib on the rigid jaw of the knotter whereby to bring about a scissor gripping action for efficiently holding different sizes of twine and tape.

A further important object of my invention is the provision of a smooth side guide ear on the rigid jaw having a curved guide face leading directly toward the jaw so that the string, cord or tape will be more effectively guided over the closed jaws during the turning of the knotter.

A still further object of my invention is to provide an improved knotter, which will be durable and efficient in use, one that will be simple and easy to manufacture, and one which can be maintained in a good operable condition over a long period of time.

With these and other objects in view, the invention consists in the novel construction, arrangement and formation of parts, as will be hereinafter more specifically described and claimed, and illustrated in the accompanying drawings, in which drawings, FIGURE 1 is a fragmentary vertical sectional view through a main supporting bracket showing my improved knotter in side elevation;

FIGURE 2 is a sectional view taken on the line 2—2 of FIGURE 1, looking in the direction of the arrows and taken at right angles to FIGURE 1, the knotter being shown in front elevation;

FIGURE 3 is a detail sectional view through the knotter taken on the line 3—3 of FIGURE 2, looking in the direction of the arrows;

FIGURE 4 is ar view similar to FIGURE 3, but showing the movable jaw in its closed position;

Figure 5:
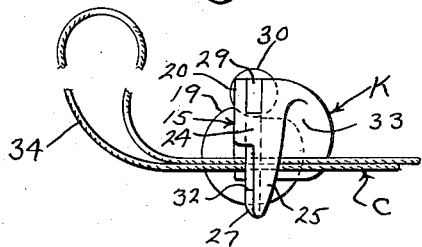
FIGURE 5 is a top plan view of the knotter head showing the looped cord brought across the knotter and under the knotter jaws, it being understood that the loop is around a package or bundle.
Figure 6:
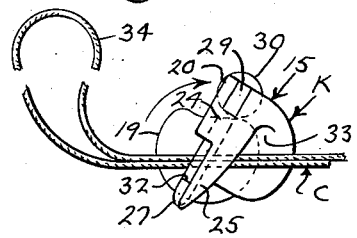
FIGURE 6 is a view similar to FIGURE 5 and showing the knotter being turned and in its initial starting position for bringing the twine in proper position for movement over the closed jaws.
Figure 7:
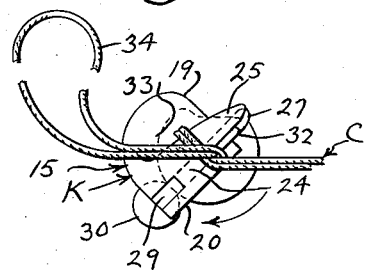
FIGURE 7 is a view similar to FIGURES 5 and 6 but showing the knotter head turned substantially ¾ of a revolution with the twine ends brought over the closed jaws with the knot in a partially twisted position.
Figure 8:
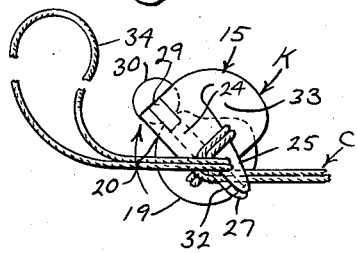
FIGURE 8 is a view similar to FIGURE 7 but showing the knotter head moving toward its initial position with the movable jaw open and receiving the twine ends.

Referring to the drawings in detail, wherein similar reference characters designate corresponding parts throughout the several views, the letter K generally indicates my improved knotter and again, the kotter is of the same general type as shown in the above-mentioned original patents, and functions generally in the same manner as shown in said patents.

The knotter K includes a knotter head 15 rigidly mounted or formed on a vertically extending shaft 16 rotatably mounted on a main bearing bracket 17 forming a part of the machine shown in Patent No. 2,346,786. The lower end of the shaft has keyed or otherwise secured thereto a beveled pinion 18 and the shaft is turned one revolution on each operation of the knotter in the manner shown in said last mentioned patent. The frame bracket 17 has formed on its upper surface a cam track 19 of identically the same character as in the last mentioned patent and during the rotation of the shaft 16 and the knotter head 15, the cam track cooperates with a part of the knotter head to bring about the opening and closing of the movable knotter jaw.

The knotter head 15 constituting the present invention includes an upright body 20 having a vertically extending slot 21 therethrough. This slot terminates short of the top and bottom of the body and defines one side wall 22 and an outer side wall 23. The walls 22 and 23 are connected by a top bridge or wall 24 which effectively prevents the spreading of said side walls 22 and 23. Projecting forwardly from the upper end of the side wall 23 adjacent to the extreme top of the slot 21 is a tapering rigid jaw 25. Formed on the rigid jaw and extending longitudinally thereof substantially throughout its entire length is a laterally positioned horizontally disposed rib or ledge 26.

Disposed within the vertical slot 21 is a movable jaw 27 and the movable jaw is mounted for rocking movement on a sturdy bearing pin 28 carried by the side walls 22 and 23. The movable jaw 27 extends forwardly of its pivot pin and alongside of the rigid jaw 25 and is adapted to move toward and away from the rigid jaw and up against the ledge or rib 26. The movable jaw 27 has formed thereon a rearwardly and downwardly extending arm 29 carrying an anti-friction roller 30 which engages the cam track 19 so that upon rotation of the knotter head the cam track 19 can function to raise and lower the movable jaw 27. The movable jaw 27 directly below the pivot 28 is provided with a limit ear 31, which is adapted to abut against the lower portion of the knotter head or body to limit the downward movement of the jaw 27. The jaws 25 and 27 have formed thereon adjacent to their outer ends, cooperating points 32 which function initially to prevent the slipping off of the twine from the jaws during the tightening of the knot, as will later appear.

Figure 11:
FIGURE 11 is an enlarged transverse sectional view through the jaws of the knotter showing the improved construction of the jaws, the section being taken on the line 11—11 of FIGURE 9, looking in the direction of the arrows.

As best shown in FIGURE 11, the movable jaw 27 when in its closed position extends alongside and in close proximity to the inner face of the stationary jaw 25 and toward the ledge or rib 26.

The vertical slot 21 is preferably of just a width to snugly receive the movable jaw 27 so as to prevent any lateral shifting or turning movement of the movable jaw in the slot.

Formed directly on the rigid jaw 25 and constituting a direct part of the knotter body is a polished guide ear 33 for cord. This polished guide ear extends downwardly from the rear end of the rigid jaw 25 and forwardly to the base of the knotter body and the curved face of the ear leads toward and under the jaws and this curved guide ear 33 forms another salient part of the invention.

While the knotter functions in identically the same manner as the knotter in the mentioned patents, it is deemed best to give a brief description of the operation thereof to more clearly bring out the function of the rib 26 and the curved guide ear 33.

Figure 9:
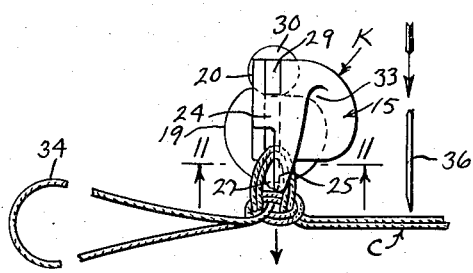
FIGURE 9 is a view similar to FIGURE 8 but showing the knotter moved back to its initial position after a complete revolution and cycle, with the knot formed and being pulled off the knotter with a part of the knot being held by the closed jaws for tightening and securing the knot.
Figure 10:
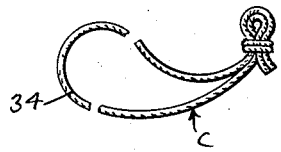
FIGURE 10 is a view showing the knot pulled tight and off of the knotter.

Now referring to FIGURES 5 to 9, inclusive, it can be seen that the cord or twine C has already been formed in a loop 34 and it is to be understood that this loop is around a bundle or package and that the cord ends are entirely in front of the knotter below the jaws and that the movable jaw is in its closed position (FIGURE 5). As the knotter starts its turning movement, the cord ends ride up the inclined guide ear (see FIG. 6), and as the knotter continues its rotation, the wound ends are brought over and around the closed jaws by the curved face of the knotter (see FIG. 7). As the knotter continues its rotation the knotter jaw 27 lowers and the cord ends are brought between the jaws (see FIG. 8). As the knotter completes its cycle (see FIG. 9), the movable jaw is raised to its closed gripping position and the knot is now pulled off from over the jaws by other mechanism of the machine, but the body portion of the knot is temporarily held, as shown in FIG. 9, so that the knot will be drawn tight and as the knot is tightened, the same is pulled out from between the jaws by the machine. At this time, the cord ends are severed and trimmed by a knife 36 forming another part of the machine.

By referring to FIGURE 11, it can be seen that as the movable jaw 27 raises the cord is not only gripped between the inner face of the jaws but by the top of the movable jaw and the rib 26.

From the foregoing description, it can be seen that I have provided an improved knotter of a rugged construction which will effectively handle all sizes of twine from 3 to 24 plies. As the rib 26 extends substantially the entire length of the rigid jaw 25 the knotter will effectively handle and grip flat tape or ribbon.

The knotter 15 and its shaft 16 is formed from a single rugged casting so as to add strength and durability to the knotter. This is in contradistinction to the knotter shown in the original patents wherein the knotter head was formed from a stamping.

Changes in details may be made without departing from the spirit or the scope of this invention, but what I claim as new is:

A knotter for packaging and like tying machines comprising a shaft, a knotter body formed on the upper end of said shaft having a vertical slot therethrough defining inner and outer walls and a top bridge wall, a forwardly extending rigid jaw on the body, and a movable jaw received in said slot, means rockably supporting the movable jaw in said slot and on the body, the movable jaw being rockable toward and away from the rigid jaw and said rigid jaw having a longitudinally extending twine gripping rib, the tie twine being receivable between the jaws when the movable jaw is in its open position, the movable jaw when in its closed position lying in close proximity to the inner face of the rigid jaw and against said rib for frictionally gripping tying cord therebetween and a guide ear formed directly on said body having a smooth curved face leading from the bottom of the body below the jaws up toward and to the upper end of said body at the rear end of the rigid jaw for guiding tying twine over the top of said jaws.

References Cited in the file of this patent

UNITED STATES PATENTS

| | | |
|---|---|---|
| 290,184 | Hunt | Dec. 11, 1883 |
| 1,038,637 | Pangburn | Sept. 17, 1912 |
| 1,176,216 | Hanson | Mar. 21, 1916 |